(12) United States Patent
Kuriyama

(10) Patent No.: US 7,434,066 B2
(45) Date of Patent: Oct. 7, 2008

(54) PORTABLE ELECTRONIC DEVICE

(75) Inventor: Ryouichi Kuriyama, Yokosuka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 715 days.

(21) Appl. No.: 11/006,784

(22) Filed: Dec. 8, 2004

(65) Prior Publication Data

US 2005/0132151 A1    Jun. 16, 2005

(30) Foreign Application Priority Data

Dec. 10, 2003   (JP)   ............... 2003-411400
Aug. 18, 2004   (JP)   ............... 2004-238602

(51) Int. Cl.
*H04L 9/32* (2006.01)
(52) U.S. Cl. ............... 713/192; 713/193; 726/2
(58) Field of Classification Search ............... 726/2, 726/26–30; 713/192–194, 189, 190
See application file for complete search history.

(56) References Cited

U.S. PATENT DOCUMENTS 5,717,956 A * 2/1998 Shinosaka et al. ............... 710/65
5,778,071 A * 7/1998 Caputo et al. ............... 713/159

FOREIGN PATENT DOCUMENTS

| EP | 0 614 159 A1 | 9/1994 |
| GB | 2 333 630 A | 7/1999 |
| WO | WO 96/28795 | 9/1996 |

OTHER PUBLICATIONS

European Search Report dated Sep. 19, 2005 for Appln. No. 04028699.9-221.

* cited by examiner

*Primary Examiner*—Hosuk Song
(74) *Attorney, Agent, or Firm*—Pillsbury Winthrop Shaw Pittman, LLP

(57) ABSTRACT

In a portable electronic device, pointer information used to access files which are divided into a plurality of record data areas is held for each logical channel, and when a file selection command which specifies a logical command is received from the exterior, access to the file is controlled based on pointer information corresponding to the logical channel specified by the file selection command.

12 Claims, 12 Drawing Sheets

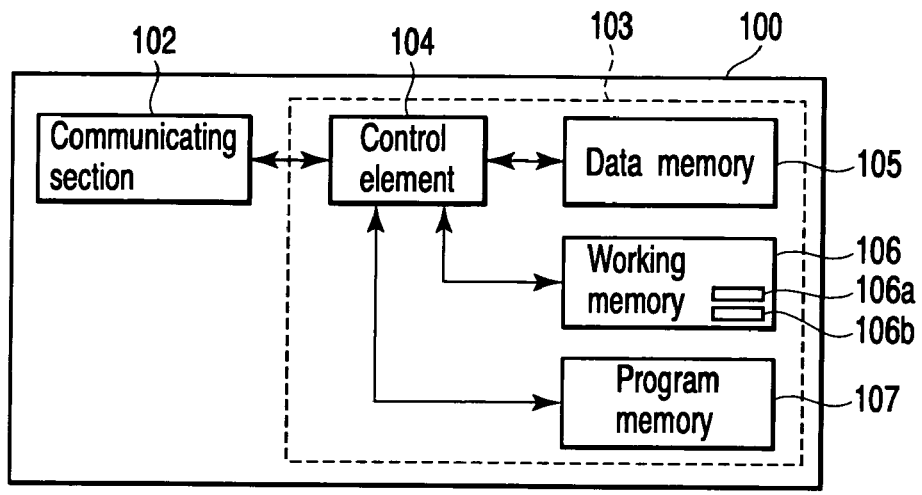
F I G. 1
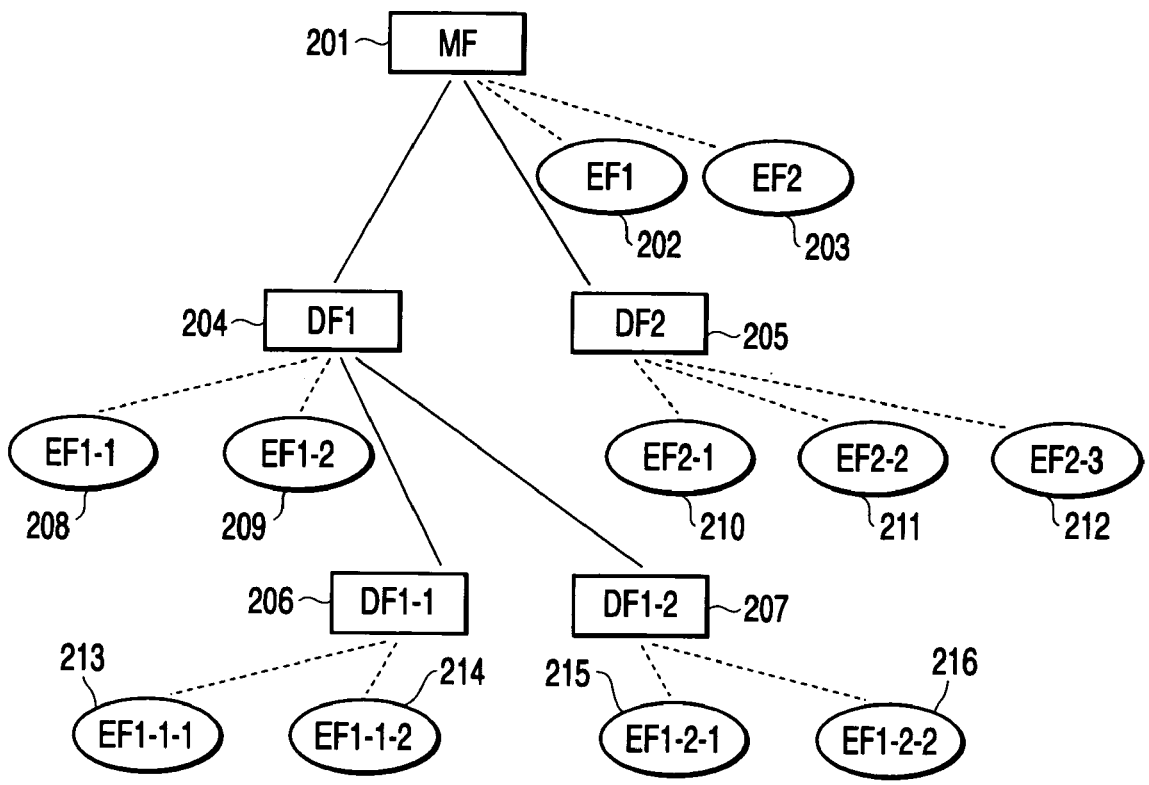
F I G. 2

| CLA | INS | P1 | P2 | Le |
|---|---|---|---|---|
| 01 | 84 | 00 | 00 | 08 |

| Logical channel number | Flag indicating that "Get Challenge" command has been executed | Random number data |
|---|---|---|
| #0 | 0 | |
| #1 | 1 | 9D F4 52 4A 87 3F 17 5E |
| #2 | 0 | |
| #3 | 0 | |

FIG. 12

| Response data | Status word |
|---|---|
| xxxxxxxxxxxx | 9000 |

FIG. 13

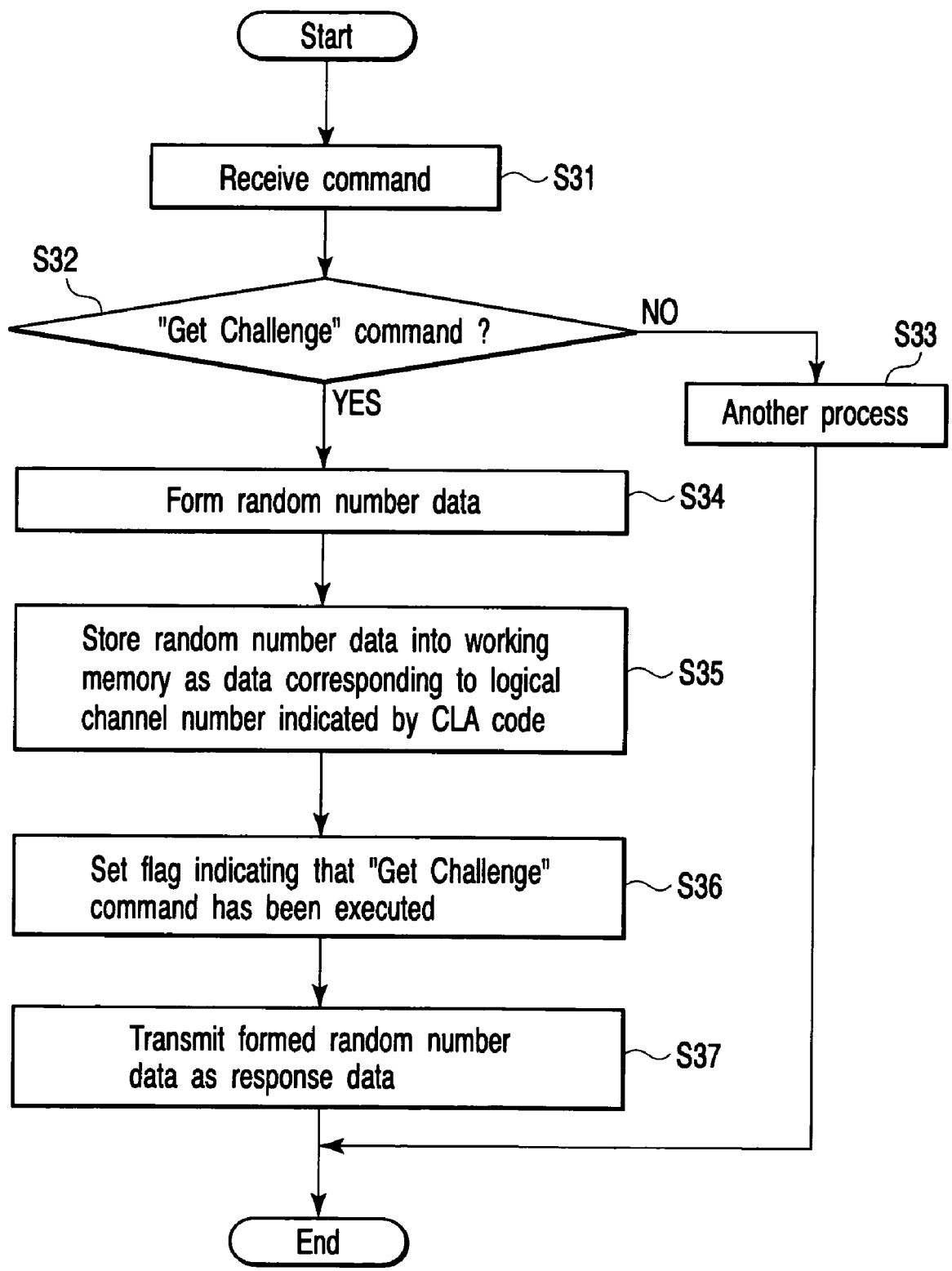
F I G. 14

| CLA | INS | P1 | P2 | Le | Data |
|-----|-----|----|----|----|------|
| 01 | 82 | aa | bb | 08 | 8byte |

FIG. 15

| P1 data | 01 | Single DES |
|---------|----|-----------|
|         | 02 | Triple DES |

FIG. 16

| P2 data | 01~1F | KEY ID |
|---------|-------|--------|

FIG. 17

| 0x01 | KEY DATA 1 |
|------|------------|
| 0x02 | KEY DATA 2 |
| 0x03 | KEY DATA 3 |
| 0x04 | KEY DATA 4 |
|   |   |
| 0x1D | KEY DATA 29 |
| 0x1E | KEY DATA 30 |
| 0x1F | KEY DATA 31 |

FIG. 18

PORTABLE ELECTRONIC DEVICE

CROSS-REFERENCE TO RELATED APPLICATIONS

This application is based upon and claims the benefit of priority from prior Japanese Patent Applications No. 2003-411400, filed Dec. 10, 2003; and No. 2004-238602, filed Aug. 18, 2004, the entire contents of both of which are incorporated herein by reference.

BACKGROUND OF THE INVENTION

1. Field of the Invention

This invention relates to a portable electronic device called an IC card having a data programmable or rewritable non-volatile memory, and in which various control operations are performed in response to external commands.

2. Description of the Related Art

Generally, an IC card as a portable electronic device is operated based on a specification defined by ISO/IEC7816-4 which is an International Standard Specification. In ISO/IEC7816-4, access to a file such as a linear EF (Elementary File) or cyclic EF in response to a command such as a read command or record command is defined. Further, in ISO/IEC7816-4, access to each file by use of a record pointer used as pointer information is described.

In ISO/IEC7816-4, it is defined that a plurality of current states are set up by use of logical channels. However, in ISO/IEC7816-4, the operation of the record pointer for each logical channel is not defined in detail. Therefore, in the conventional IC card, data used for an authentication process cannot be held for each logical channel and data used for authentication or the like is commonly used for a plurality of logical channels.

Thus, in the conventional IC card, since the record pointer is commonly used for the logical channels, there occurs a problem that the state of the record pointer of a certain logical channel may be changed by another logical channel.

When the authentication process is performed by use of an "External Authenticate" command and "Get Challenge" command defined by ISO/IEC7816-4, Challenge data (random number data) obtained by use of the "Get Challenge" command executed in the logical channel #1 can also be used in the logical channel #2 in the conventional IC card. This means that Challenge data generated in an application 1 can also be used in an application 2 when the logical channel is allocated to each application.

Further, when Challenge data is formed in the logical channel #2 after Challenge data was formed in the logical channel #1, the Challenge data formed in the logical channel #1 may be modified into the Challenge data formed in the logical channel #2 in some cases in the conventional IC card.

Thus, since the record pointer is commonly used for the logical channels in the conventional IC card, there occurs a problem that random number data formed in a certain logical channel may be used by another logical channel or modified into random access data formed in another logical channel.

BRIEF SUMMARY OF THE INVENTION

An object of this invention is to provide a portable electronic device capable of holding data for each logical channel and performing a control operation for each logical channel.

A portable electronic device according to an aspect of the present invention comprises a first memory which stores data, a second memory which stores management information for data stored in the first memory for each logical channel, and a control section which controls access to data stored in the first memory based on management information stored for each logical channel in the second memory.

A portable electronic device according to another aspect of the present invention comprises a first memory which stores files divided into a plurality of record data areas, a second memory which stores pointer information for the record data area in the file stored in the first memory for each logical channel, and a control section which controls access to data in the file stored in the first memory based on pointer information stored for each logical channel in the second memory.

A portable electronic device according to a further aspect of the present invention comprises a communicating section which transmits/receives data with respect to the exterior, a control section which forms data according to a received command when the communicating section receives a command which requests formation of data containing information indicating a logical channel from the exterior, and a memory which stores data formed by the control section as data corresponding to a logical channel specified by the command.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram schematically showing the configuration of an IC card according to one embodiment of this invention;

FIG. 2 is a conceptual diagram showing the file structure in the data memory;

FIG. 11 is a diagram showing a format of a "Get Challenge" command;

FIG. 12 is a diagram showing an example of the configuration of a random number data storage table;

FIG. 13 is a diagram showing an example of the configuration of a response with respect to a command;

FIG. 14 is a flowchart for illustrating the operation of an IC card when the "Get Challenge" command is received;

FIG. 15 is a diagram showing a format of an "External Authenticate" command;

FIG. 16 is a diagram showing an example of P1 data of the "External Authenticate" command;

FIG. 17 is a diagram showing an example of P2 data of the "External Authenticate" command;

FIG. 18 is a diagram showing a concrete example of key data in the P2 data of the "External Authenticate" command;

DETAILED DESCRIPTION OF THE INVENTION

Figure 3:
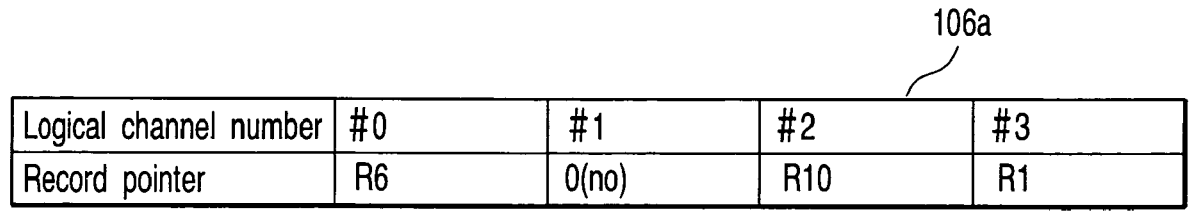
FIG. 3 is a diagram showing the storage state of a record pointer for each logical channel number.

There will now be described the best mode of a preferable embodiment of this invention with reference to the accompanying drawings.

FIG. 1 schematically shows the configuration of an IC card 100 according to one embodiment of this invention. The IC card 100 includes a communicating section 102 and one or a plurality of IC chips 103. The communicating section 102 performs data transmission/reception with respect to an external device (card reader/writer).

When the IC card 100 is a radio type IC card, the communicating section 102 is configured by an antenna and a transmission/reception section. Further, the communicating section 102 of the radio type IC card receives modulated waves transmitted from a radio type card reader/writer in a noncontacting manner or transmits the modulated wave to the exterior. In the radio type IC card, power source voltage supplied to the internal circuit and a clock pulse used to operate the same are formed based on the modulated wave received from the card reader/writer by use of the communicating section 102.

Further, when the IC card 100 is a contacting type IC card, the communicating section 102 is configured by a contact section. The communicating section 102 of the contacting type IC card performs data transmission/reception by setting the same in contact with an IC card contact terminal portion provided on the card reader/writer. In the contacting type IC card, power source voltage supplied to the internal circuit and a clock pulse used to operate the same are derived from the card reader/writer by use of the communicating section 102.

The IC chip 103 includes a control element (for example, CPU) 104, data memory 105, working memory 106 and program memory 107. The IC chip 103 is buried in the main body of an IC card while it is connected to the communicating section 102.

The control element 104 controls the whole portion of the IC card 100 and is operated based on the control program stored in the program memory 107 or data memory 105.

The data memory 105 is a rewritable nonvolatile memory which stores various data items. For example, the data memory 105 is configured by a rewritable nonvolatile memory such as an EEPROM (Electrically Erasable and Programmable Read Only Memory).

The working memory 106 is a working memory which temporarily holds data processed when the control element 104 performs the processing operation. For example, the working memory 106 is configured by a nonvolatile memory such as a RAM (Random Access Memory). Further, tables 106a and 106b which will be described later are provided in the working memory 106. In the table 106a, information (for example, record number) indicating a record pointer (current record) for each logical channel is stored. In the table 106b, random number data is stored for each logical channel.

The program memory 107 is a nonvolatile memory which stores a control program and the like containing a sub-routine which realizes the basic function of the IC card. For example, the program memory 107 is configured by a rewritable nonvolatile memory such as a mask ROM (Read Only Memory).

Next, the data file structure stored in the data memory 105 is explained.

FIG. 2 is a diagram showing an example of the configuration of the file structure stored in the data memory 105.

The file structure shown in FIG. 2 has a tree structure of directories having various types of folders. The file structure shown in FIG. 2 is based on ISO/IEC7816-4. Based on the above file structure, a plurality of applications can be registered in the data memory 105.

In the file structure shown in FIG. 2, an MF (Master File) 201 is set in the highest position. Below the MF 201, EFs (Elementary Files) 202, 203 and DFs (Dedicated Files) 204, 205 which store data are provided. Further, below the DF 204, a DF 206 is provided. Below the DF 205, a DF 207 is provided. Below the DFs 204, 205, 206, 207, EFs 208, 209, 210, 211, 212, 213, 214, 215, 216 which are used to store user data or the like are provided. The DFs 204, 205 are folders which are set for each application.

In the following explanation, the MF 201 is also referred to as MF, EF 202 as EF1, EF 203 as EF2, DF 204 as DF1, DF 205 as DF2, DF 206 as DF1-1, DF 207 as DF1-2, EF 208 as EF1-1, EF 209 as EF1-2, EF 210 as EF2-1, EF211 as EF2-2, EF 212 as EF2-3, EF 213 as EF1-1-1, EF 214 as EF1-1-2, EF 215 as EF1-2-1, and EF 216 as EF 1-2-2.

Management of the record pointer for each logical channel in this invention is explained in detail below.

In EF (Elementary FIle), files of two types including a linear type and cyclic type are provided. Further, when access is made by use of a record number, the following two types of the first record (record data) are provided depending on the type of EF.

In the case of the linear type: Record of first data

In the case of the cyclic type: Record of last data

As a method for referring to record data of EF (access to record data), the following three types of methods (a), (b), (c) are provided. In the present embodiment, the reference methods of (b) and (c) can be utilized for each logical channel.

(a) Access by Specifying Record Number:

A record number is internally attached to record data stored in EF. By specifying the record number, record data in EF can be selectively read out or rewritten.

(b) Access by Recording Pointer (Next/Previous Mode):

Access by use of the record pointer is made to read out or rewrite record data in a relative position with the record pointer set as a reference point. In this case, if the process is successfully performed, the record pointer indicates record data which has been processed. The relative position indicates a record before the current record or a record next to the current record.

(c) Access by Specifying Record Pointer:

Access made by specification of the record pointer is to access record data indicated by the record pointer.

The position of the record pointer and the record to be referred to are explained below based on the methods (a), (b), (c).

FIG. 3 is a diagram showing an example of the configuration of the table 106a indicating the storage state of the record pointer for each logical channel.

As shown in FIG. 3, the record pointer is stored in the table 106a of the working memory 106 for each logical channel number (#0, #1, #2, #3) supported by the IC card. Further, in the record pointer, a record number is stored. Therefore, in an example shown in FIG. 3, the record pointer of the logical channel #0 is a record number "R6". The record pointer of the logical channel #2 is a record number "R10". The record pointer of the logical channel #3 is a record number "R1".

It is assumed that a record number "0" is not set in the record pointer. In the example shown in FIG. 3, the record pointer of the logical channel #1 is a record number "0". In this case, this indicates a state in which the record pointer of the logical channel #1 is not set.

Next, an example of the configuration of EF in the data memory 105 is explained.

Figure 4:
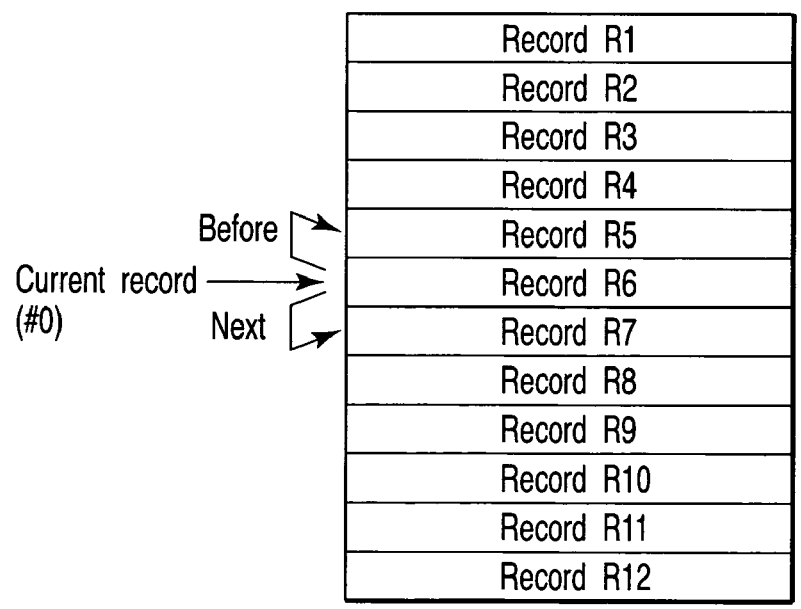
FIG. 4 is a diagram showing one example of an EF in the data memory.

FIG. 4 is a diagram showing one example of access to EF based on the record pointer of the logical channel #0 shown in FIG. 3.

In the "previous mode", if the record pointer of the logical channel #0 indicates the record number "R6" as shown in FIG. 3, record data to be accessed is indicated by a record number "R5" which lies immediately before the record number "R6" indicated by the record pointer as shown in FIG. 4. Further, In the "next mode", record data to be accessed is indicated by a record number "R7" which lies immediately after the record number "R6" indicated by the record pointer as shown in FIG. 4. If the above access is successfully made, the record number indicated by the record pointer of the logical channel #0 is changed into an accessed record number. According to the present embodiment, the above process can be performed for each logical channel. The record number indicated by the record pointer is called a current record.

Next, transition of the current record is explained.

As described before, the following three types of methods are provided as a method for reference of the record in EF (transition of the current record).

(1) Access to Record Data by Specification of Record Number (2) Access to Record Data by Specification of Next Mode or Previous Mode (3) Access to Record Data by use of Record Pointer The current record is a record which is temporarily set into a current state according to the following rules when access is made to EF. The current record is indicated by a record pointer for each logical channel managed by the table 106a as shown in FIG. 3. In the rules explained below, a state in which "the pointer is initialized" is a state in which the current record does not exist and the record number indicated by the record pointer becomes "0".

Rule 1: The pointer is initialized when EF is selected by a select file (SELECT FILE) command.

Rule 2: If a command which specifies a next mode or previous mode with respect to EF is executed and correctly terminated, the record pointer is moved to an object record number.

Rule 3: If the command is not correctly terminated, the record pointer is not moved.

Rule 4: When the record pointer lies in the record number "R1" in EF, an error status is output in the next previous process. In this case, the record pointer is not moved.

Rule 5: When the record pointer lies in the final record Rn (maximum value) in EF, an error status is output in the next previous process. In this case, the record pointer is not moved.

Next, the logical channel defined in ISO/IEC7816-4 is explained. In this embodiment, the explanation is made on the assumption that four logical channels (#0, #1, #2, #3) shown in FIG. 3 are supported.

Each of the logical channels is set into a usable state by a manage channel command. The manage channel command is a command defined in ISO/IEC7816-4. It is assumed that the logical channel #0 can be normally used. Further, it is assumed that it is necessary to previously set the logical channel #1, #2 or #3 which is next used into the usable state by use of the manage channel command.

The logical channel number indicating the logical channel used is set in each DF by use of the select file command. In various types of commands, the logical channel used is specified by a logical channel number. The logical channel number in each command is coded in a CLA byte of each command. As a result, it becomes possible to determine the type of one of the access commands for DF and EF to which each command corresponds by use of the CLA byte.

Next, access to the file using a plurality of logical channels as described above is explained in detail.

In this embodiment, a logical channel number indicating a logical channel is represented by "#*" and EF-ID (EF identification number) or DF-ID (DF identification number) indicating the file of EF or DF is represented by "<>" or "<**>".

Figure 5:
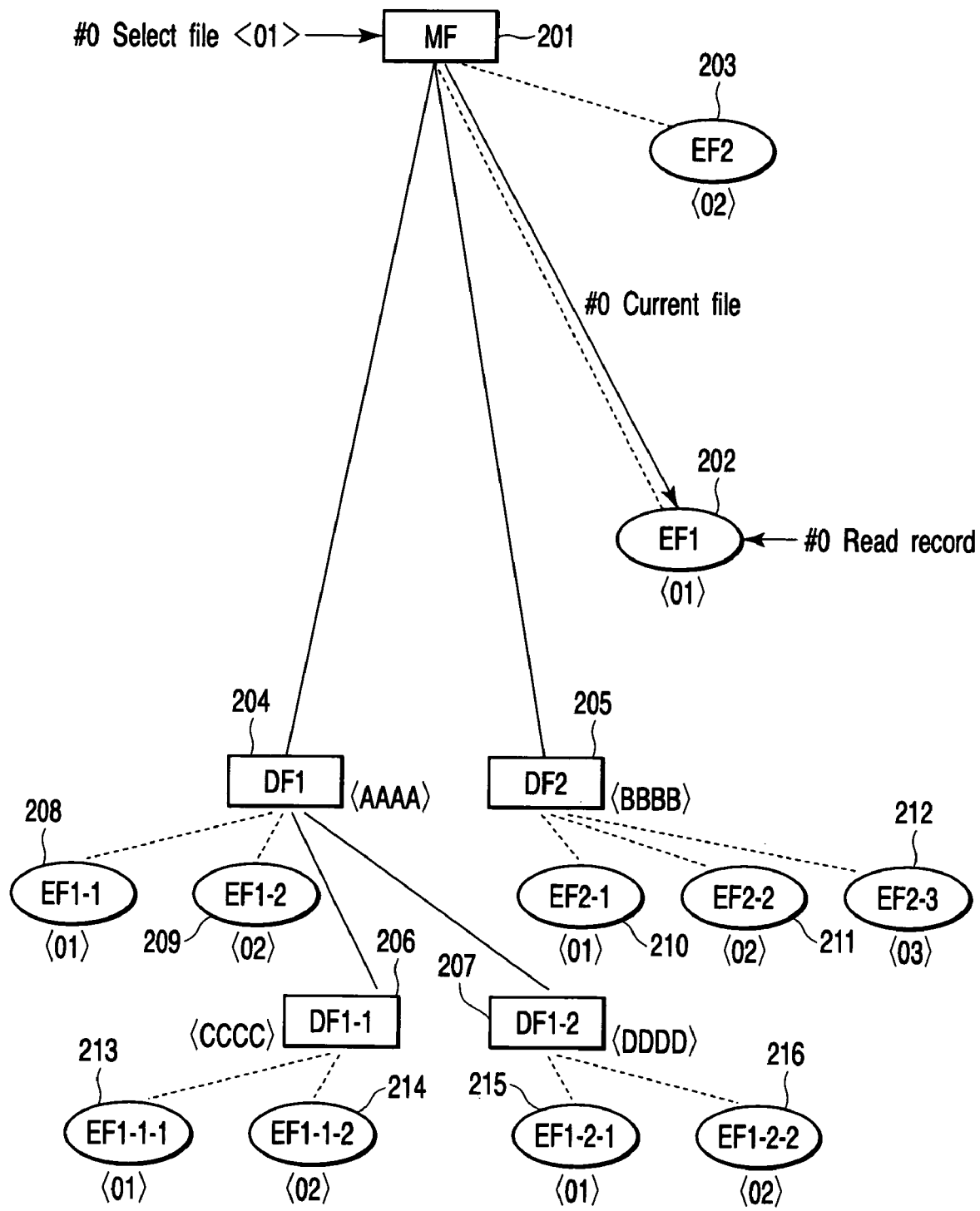
FIG. 5 is a diagram for illustrating the conception of a logical channel.

First, the procedure for accessing to the file in a specified logical channel is explained. FIG. 5 is a diagram for illustrating the procedure for reading out data of EF1 below MF in the logical channel #0.

It is assumed that MF is set into a current state in all of the logical channels immediately after the IC card 100 is activated (started). In this example, the procedure for reading out data of EF1 from an IC card in which MF is set in the current state in the data memory 105 is explained.

The card reader/writer supplies a command (#0 Select File <01>) which sets EF1 into the current state in the logical channel #0 to the IC card 100. When the command (#0 Select File <01>) is received, the control element 104 of the IC card 100 sets EF1 indicated by an EF identification number <01> among the files below MF in the data memory 105 into the current state as shown in FIG. 5.

Further, the card reader/writer supplies a command (#0 Read Record) which requests readout of data from the file (in this example, EF1) set in the current state in the logical channel #0 to the IC card 100. When the command (#0 Read Record) is received, the control element 104 of the IC card 100 reads out data in EF1 in the data memory 105. At this time, the control element 104 of the IC card 100 reads out data of a record number indicated by the record pointer corresponding to the logical channel #0 based on the table 106a shown in FIG. 3.

According to the above procedure, the other DFs (DF1 and DF2) are not set in the current state. Therefore, even if the IC card receives a read command which requests readout of record data or a write command which requests write of data, access to the file other than EF1 set in the current state is not made.

Next, the procedure for accessing the file in a plurality of logical channels is explained.

Figure 6:
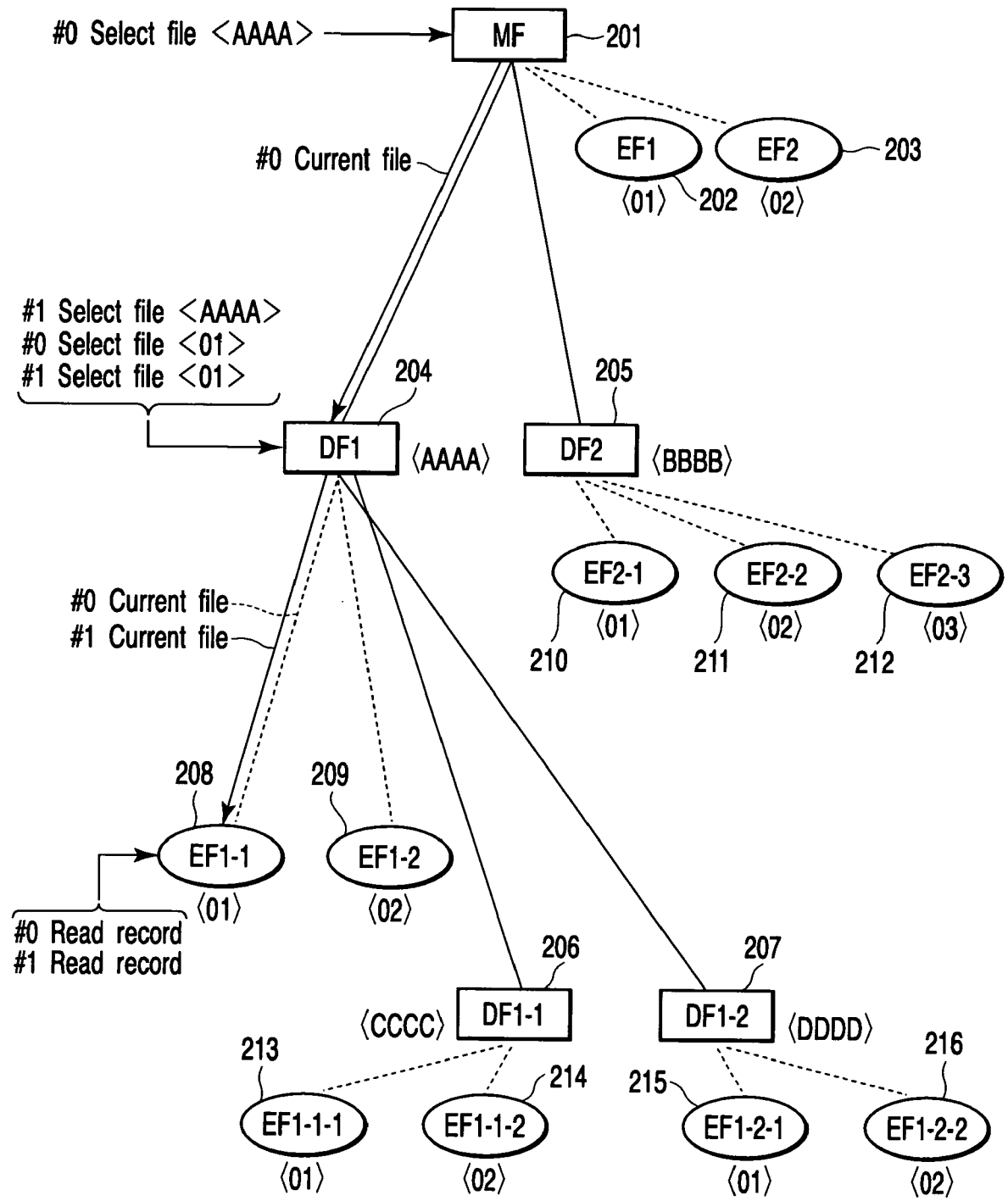
FIG. 6 is a conceptual diagram showing the file structure in a state in which the logical channel number #1 is allocated to DF1.

FIG. 6 is a diagram for illustrating the procedure for accessing EF1 below DF1 by use of the logical channels #0 and #1.

First, it is assumed that MF in the data memory 105 is set in the current state in the IC card 100. In this state, the card reader/writer supplies a command (#0 Select File <AAAA>) which sets DF1 into the current state in the logical channel #0 to the IC card 100. When the command (#0 Select File <AAAA>) is received, the control element 104 of the IC card 100 sets DF1 indicated by a DF identification number <AAAA> among the files below MF in the data memory 105 into the current state of the logical channel #0 as shown in FIG. 6.

Further, the card reader/writer supplies a command (#1 Select File <AAAA>) which sets DF1 into the current state in the logical channel #1 to the IC card 100. When the command (#1 Select File <AAAA>) is received, the control element 104 of the IC card 100 sets DF1 indicated by the DF identification number <AAAA> in the data memory 105 into the current state of the logical channel #1 as shown in FIG. 6.

In this state, in the IC card 100, DF1 in the data memory 105 is set in the current state in the logical channels #0 and #1. Therefore, EFs (EF1-1, EF1-2) below DF1 can be accessed by use of the logical channels #0 and #1.

In the above state, the procedures (1) to (5) for reading out data of EF1-1 below DF1 by use of the logical channels #0 and #1 are explained.

(1) Data of EF1-1 is read out in the logical channel #0. This is attained by performing the following procedures (1-1) and (1-2).

(1-1) The IC card 100 receives a command (#0 Select File <01>) which sets EF1 into the current state in the logical channel #0 from the card reader/writer. Then, as shown in FIG. 6, the control element 104 of the IC card 100 sets EF1-1 indicated by an EF identification number <01> among the files below DF1 in the data memory 105 into the current state in the logical channel #0.

(1-2) In this state, when a command (#0 Read Record) which requests readout of data from the file (in this example, EF1-1) set in the current state in the logical channel #0 is received from the card reader/writer, the control element 104 of the IC card 100 reads out data in EF1-1. At this time, the control element 104 of the IC card 100 reads out record data in EF1-1 based on a record number indicated by the record pointer of the logical channel #0 in the table 106a shown in FIG. 3.

For example, if the IC card 100 is set in the next mode, the control element 104 reads out data of a record number which is next to the record number indicated by the record pointer of the logical channel #0 in the table 106a shown in FIG. 3. In this case, it is assumed that the record pointer is set to "0" as the initial state if a file (in this example, EF1-1) is selected by the SELECT FILE command based on the rule 1. Therefore, the control element 104 of the IC card 100 reads out record data of the record number "R1" of EF1-1 and sets the record number "R1" as the record pointer of the logical channel #0 into the table 106a.

(2) Next, data of EF1-1 is read out in the logical channel #1. This is attained by performing the following procedures (2-1) and (2-2).

(2-1) When a command (#1 Select File <01>) is received from the card reader/writer, the control element 104 of the IC card 100 sets EF1-1 into the current state in the logical channel #1.

(2-2) In this state, when a command (#1 Read Record) is received from the card reader/writer, the control element 104 of the IC card 100 reads out data in EF1-1. At this time, the control element 104 of the IC card 100 reads out record data in EF1-1 based on a record number indicated by the record pointer of the logical channel #1 in the table 106a shown in FIG. 3.

For example, if the IC card 100 is set in the next mode, the control element 104 reads out data of a record number which is next to the record number indicated by the record pointer of the logical channel #1 in the table 106a shown in FIG. 3. In this case, it is assumed that the record pointer is set to "0" in the initial state in the table 106a. Therefore, the control element 104 of the IC card 100 reads out record data of the record number "R1" of EF1-1 and sets the record number "R1" as the record pointer of the logical channel #1 into the table 106a.

(3) Further, when a command (#0 Read Record) is received, the control element 104 of the IC card 100 reads out record data in EF1-1 based on a record number indicated by the record pointer of the logical channel #0 in the table 106a shown in FIG. 3. If the IC card 100 is set in the next mode, the record pointer of the logical channel #0 is set to "R1" in the table 106a shown in FIG. 3 in the above procedure (1). Therefore, the control element 104 of the IC card 100 reads out record data of a record number "R2" which is next to the record number "R1" of EF1-1 and sets the record number "R2" as the record pointer of the logical channel #0 into the table 106a.

(4) Further, when a command (#1 Read Record) is received, the control element 104 of the IC card 100 reads out record data in EF1-1 based on a record number indicated by the record pointer of the logical channel #1 in the table 106a shown in FIG. 3. If the IC card 100 is set in the next mode, the record pointer of the logical channel #1 is set to "R1" in the table 106a shown in FIG. 3 in the above procedure (2). Therefore, the control element 104 of the IC card 100 reads out record data of a record number "R2" which is next to the record number "R1" of EF1-1 and sets the record number "R2" as the record pointer of the logical channel #1 into the table 106a.

(5) Further, when a command (#0 Read Record) is received, the control element 104 of the IC card 100 reads out record data in EF1-1 based on a record number indicated by the record pointer of the logical channel #0 in the table 106a shown in FIG. 3. If the IC card 100 is set in the next mode, the record pointer of the logical channel #0 is set to "R2" in the table 106a shown in FIG. 3 in the above procedure (3). Therefore, the control element 104 of the IC card 100 reads out record data of a record number "R3" which is next to the record number "R2" of EF1-1 and sets the record number "R3" as the record pointer of the logical channel #0 into the table 106a.

As described above, in the IC card, a table indicating current codes for the respective logical channels is set and access to data in the file is controlled based on the current code for each logical channel by referring to the table. Thus, access to the different files for the respective logical channels can be controlled.

Next, the configuration of each command which specifies the logical channel is explained.

Figure 7:
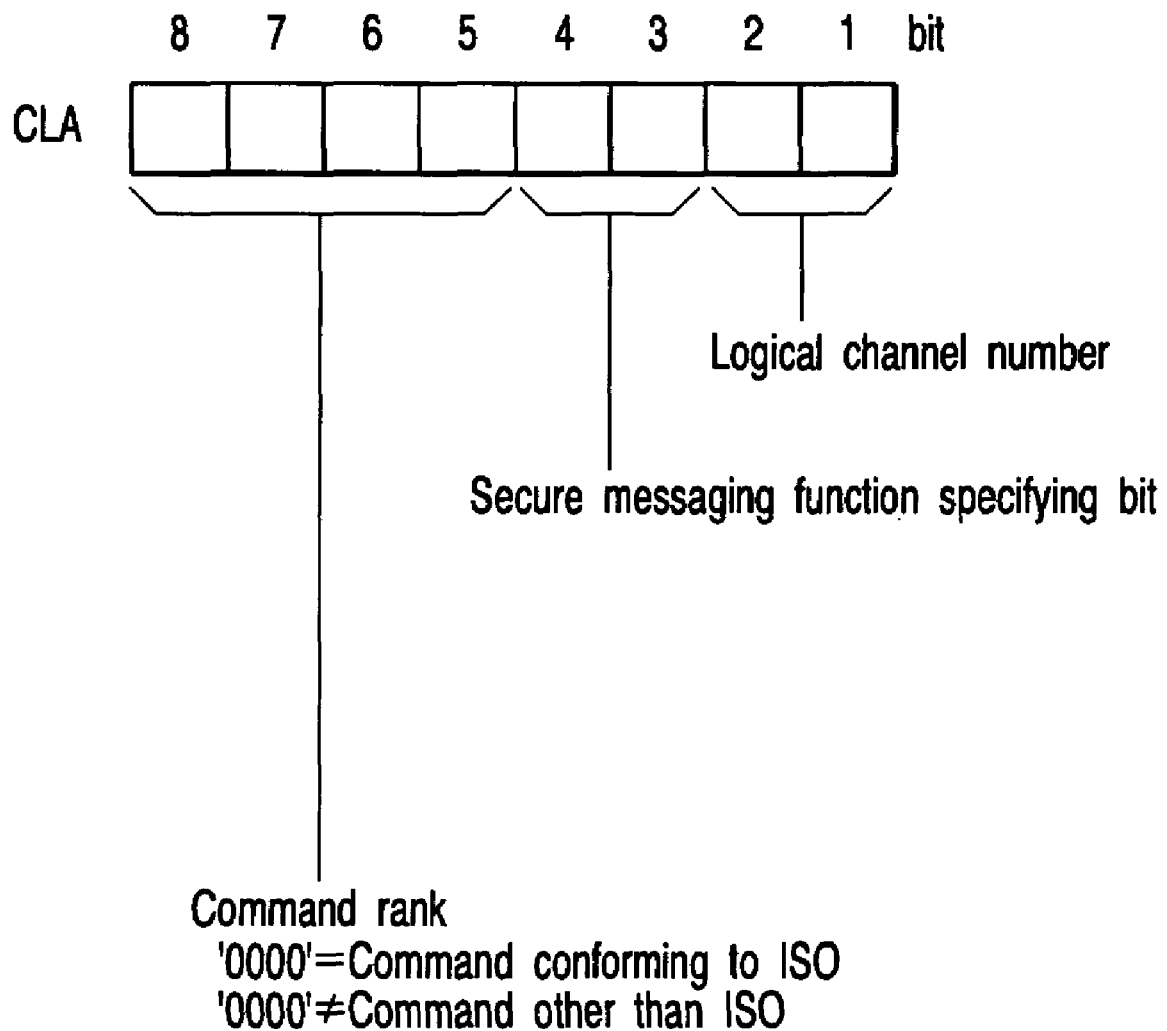
FIG. 7 is a diagram for illustrating a coding process of a CLA byte of a command.

FIG. 7 is a diagram showing an example of the configuration of each command. In this case, it is assumed that the logical channel number of the logical channel specified by each command is coded in the following position in the CLA byte (CLA data) of the command according to ISO/IEC7816-4.

In the example shown in FIG. 7, the CLA byte is configured by eight bits. In the CLA byte, the first bit (b1) and second bit (b2) are used to specify the logical channel number of the command. That is, in the example of FIG. 7, the logical channel number used is represented by the second bit (b2) and first bit (b1) of the CLA byte. Therefore, in the configuration of FIG. 7, the logical channel numbers of four at maximum including "00", "01", "10", "11" in each command can be specified. For example, it is assumed that the logical channel number "#0", "#1", "#2" or "#3" is set when "b2, b1" is set at "00", "01", "10" or "11".

The third bit (b3) and fourth bit (b4) of the CLA byte are bits (SM data) which specify a secure messaging function. In the present embodiment, "b4, b3" is set at "00", for example.

Further, the fifth bit (b5), sixth bit (b6), seventh bit (b7) and eighth bit (b8) of the CLA byte are called a CLA code and are data indicting the rank of the command. For example, when the CLA code is "0000", it is indicated that the CIA code is a command in conformity to ISO. Further, if the CIA code is not "0000", it is indicated that the CIA code is a command which does not conform to ISO (command other than ISO).

The logical channels (logical channel numbers #0 to #3) are set into the state in which they can be used by a manage channel command defined by ISO/IEC7816-4. For example, the logical channel #0 can be normally used and it is necessary to previously set the logical channels #1 to #3 into a state in which the logical channel number used by the manage channel command can be used.

Next, the authentication process of the IC card 100 is explained.

In the following explanation, the authentication process between the IC card 100 and a terminal device (center) as an external device is explained.

Figure 8:
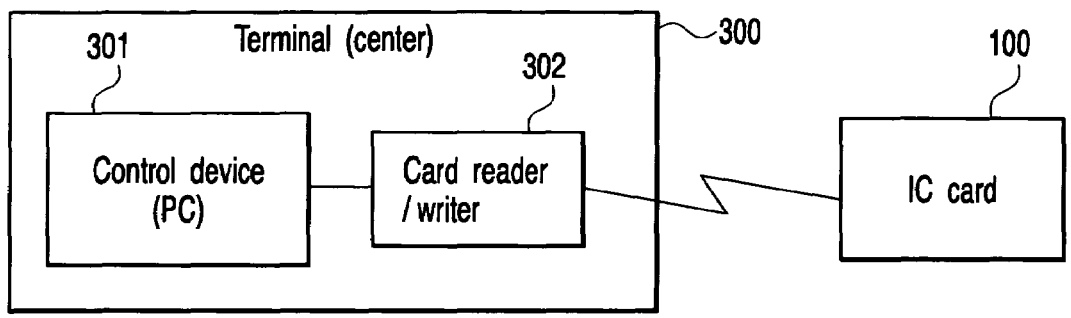
FIG. 8 is a diagram schematically showing one example of the configuration of an IC card system configured by an IC card and a terminal as an external device.

FIG. 8 is a diagram schematically showing one example of the configuration of an IC card system configured by the IC card 100 and a terminal (center) 300 as an external device. As shown in FIG. 8, in the IC card system, the IC card 100 can communicate with the terminal 300. The IC card 100 shown in FIG. 8 has the configuration as shown in FIG. 1, for example. Further, the terminal 300 has a control device 301 and card reader/writer 302.

For example, the control device 301 of the terminal 300 is configured by a personal computer (PC) having a CPU, various memories, various interfaces and the like. The CPU of the control device 301 performs the operating processes and control operations for the various portions based on a program stored in a memory (not shown), for example.

The card reader/writer 302 is a unit which communicates with the IC card 100. The card reader/writer 302 is connected to the control device 301 via an interface (not shown). The card reader/writer 302 is operated based on the control operation of the control device 301.

With the above configuration, in the IC card system, the authentication process for the IC card 100 by the terminal 300 or the authentication process for the terminal 300 by the IC card 100 is performed by transmission/reception of commands between the terminal and the IC card. The authentication process for the IC card 100 by the terminal 300 is a process performed by the external device to authenticate the IC card 100. Further, the authentication process for the terminal 300 by the IC card 100 is a process performed by the IC card 100 to authenticate the terminal 300.

Further, in the present embodiment, authentication between the IC card 100 and the terminal 300 is attained by use of the following commands defined by ISO/IEC7816-4.

(a) "Internal Authenticate" command
(b) "External Authenticate" command
(c) "Get Challenge" command The "Internal Authenticate" command is a command used in the authentication process for the IC card 100 by the terminal 300. The "External Authenticate" command is a command used in the authentication process for the terminal 300 by the IC card 100. Further, the "Get Challenge" command is a command which requests a random number. Each time the "Get Challenge" command is executed, a unique random number is output.

In this embodiment, a case wherein the authentication process for the IC card 100 by the terminal 300 is performed by use of a combination of the "Internal Authenticate" command and "Get Challenge" command is explained. Further, a case wherein the authentication process for the terminal 300 by the IC card 100 is performed by use of a combination of the "External Authenticate" command and "Get Challenge" command is explained.

First, the authentication process for the IC card 100 by the terminal 300 is schematically explained.

In the authentication process for the IC card 100 by the terminal 300, it is determined whether or not the IC card 100 possesses an authentication key which the terminal 300 previously knows. The terminal 300 determines whether the IC card 100 possesses the authentication key or not based on authentication data output from the IC card 100.

Figure 9:
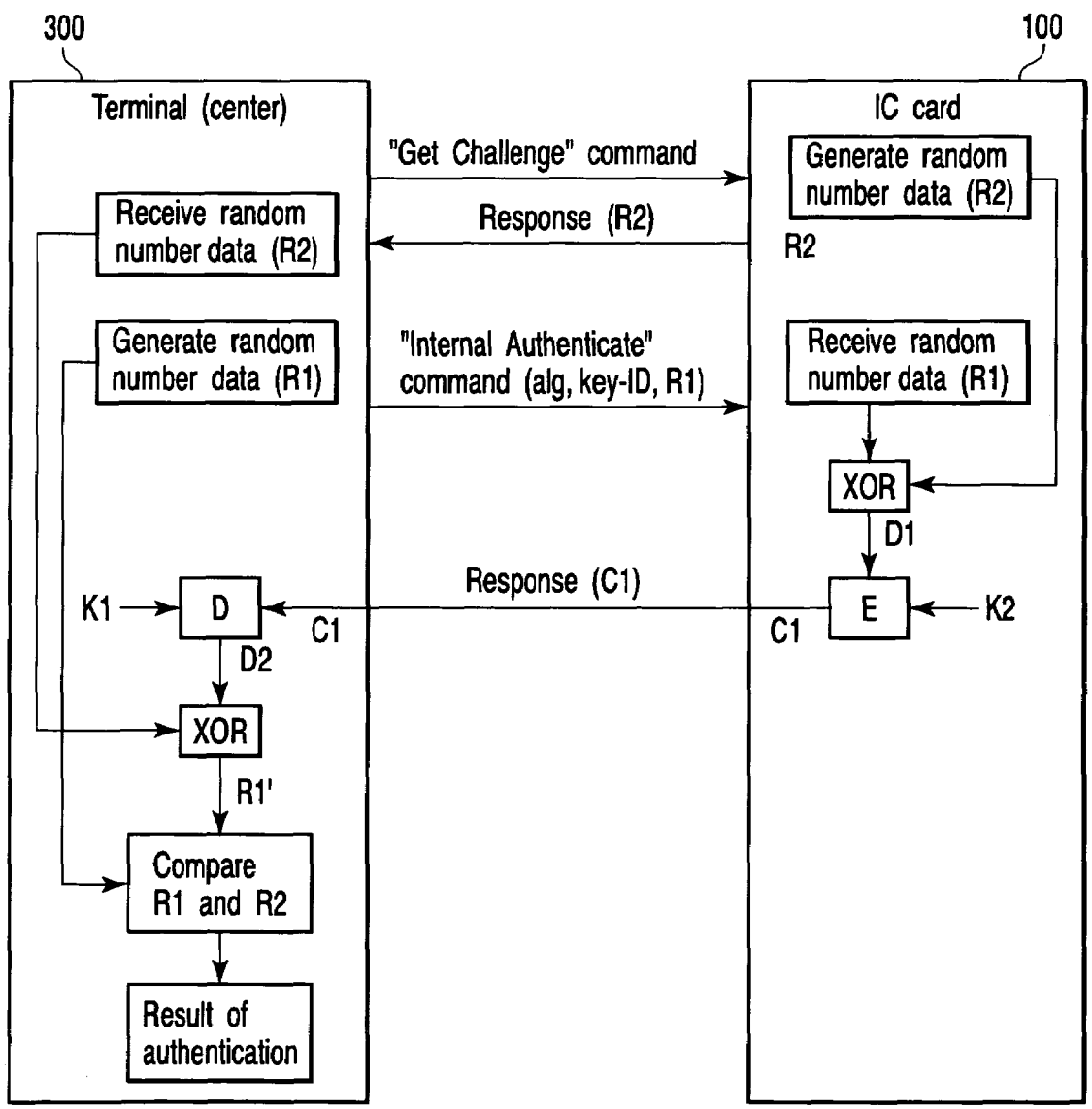
FIG. 9 is a diagram for schematically illustrating an authentication process for an IC card by the terminal.

FIG. 9 is a diagram for schematically illustrating the authentication process for the IC card 100 by the terminal 300.

The authentication process for the IC card 100 by the terminal 300 shown in FIG. 9 is performed by the procedure of the steps S1 to S10 as will be explained below.

Step S1: The terminal 300 transmits the "Get Challenge" command to the IC card 100. Thus, the terminal 300 requests the IC card 100 to form random number (challenge) data.

Step S2: The IC card 100 receives the "Get Challenge" command from the terminal 300. The IC card 100 which has received the "Get Challenge" command forms random number data (R2). When forming the random number data (R2), the IC card 100 sends back the random number data (R2) as response data corresponding to the "Get Challenge" command to the terminal 300. The random number data (R2) is held in the working memory 106 of the IC card 100 for each logical channel as will be described later.

Step S3: The terminal 300 receives random number data (R2) as response data from the IC card 100. When receiving the random number data (R2) as the response data of the "Get Challenge" command, the terminal 300 generates random number data (R2) used to authenticate the IC card 100. The random number data items (R1) and (R2) are held in the terminal 300.

Step S4: After generating the random number data (R1), the terminal 300 generates an "Internal Authenticate" command. The "Internal Authenticate" command is generated based on key data (key-ID), random number data (R1), algorithm (alg) and the like necessary for authentication. That is, the key data (key-ID), random number data (R1) and algorithm (alg) necessary for authentication are used as parameters of the "Internal Authenticate" command. When the "Internal Authenticate" command is generated, the terminal 300 transmits the thus generated "Internal Authenticate" command to the IC card 100.

The algorithm (alg) specified by the "Internal Authenticate" command is a ciphering algorithm used to perform the ciphering process by use of a ciphering key specified by the key data (key-ID) of the "Internal Authenticate" command.

Step S5: The IC card 100 receives the "Internal Authenticate" command from the terminal 300. When the "Internal Authenticate" command is received, the IC card 100 derives the XOR of the random number data (R2) generated from itself and the random number data (R1) generated from the terminal 300. In this case, the XORed value is set as D1.

Step S6: The IC card 100 determines an algorithm (alg) and key data (key-ID) specified by the "Internal Authenticate" command from the terminal 300. That is, the IC card 100 determines the algorithm (alg) and key data (key-ID) required for authentication based on the "Internal Authenticate" command from the terminal 300. In the example shown in FIG. 9, the key data is determined as a ciphering key (K2). When the algorithm and key data required for authentication are determined, the IC card 100 enciphers the value D1 derived in the step S5 by use of key data (K2) based on the algorithm. In this case, a value obtained by enciphering D1 by use of the ciphering key (K2) is set as C1.

Step S7: The IC card 100 transmits the value C1 derived in the step S7 as response data of the "Internal Authenticate" command to the terminal 300.

Step S8: The terminal 300 receives C1 as the response data of the "Internal Authenticate" command from the IC card 100. When receiving C1, the terminal 300 determines a decoding or deciphering key corresponding to key data which is informed to the IC card 100 by use of the "Internal Authenticate" command. In the example shown in FIG. 9, a deciphering key (K1) is determined. Further, it is assumed that the deciphering key (K1) is held in the terminal 300. If the deciphering key (K1) is determined, the terminal 300 deciphers C1 received from the IC card 100 by use of the deciphering key (K1). In this example, a value obtained by deciphering C1 by use of the deciphering key K1 is set as D2.

Step S9: The terminal 300 derives the XOR of the value D2 deciphered by use of the deciphering key (K1) and the value of the random number data (R2) generated from the IC card 100 in correspondence to the "Get Challenge" command. In this example, an XORed value of the D2 value and the random number data (R2) is set as R1'.

Step S10: When the XORed value R1' of D2 and random number data (R2) is derived, the terminal 300 compares the random number data (R1) output to the IC card 100 with R1'. When it is detected in the above comparing process that the random number data (R1) coincides with R1', the terminal 300 authenticates the IC card 100 (determines that the IC card 100 is a justified card). Further, if it is detected in the above comparing process that the random number data (R1) does not coincide with R1', the terminal 300 does not authenticate the IC card 100 (determines that the IC card 100 is not a justified card).

When Triple DES is specified as an algorithm (ciphering algorithm) in the "Internal Authenticate" command, the ciphering key (K2) of the IC card 100 is set equal to the deciphering key (K1) of the terminal 300 side. Each of the above enciphering system and deciphering system is a secret key ciphering system in which both of the ciphering key (K2) of the IC card 100 and the deciphering key (K1) of the terminal 300 side are used as a secret key.

Further, when RSA is specified as the algorithm (enciphering algorithm) in the "Internal Authenticate" command, the ciphering key (K1) of the IC card 100 becomes different from the deciphering key (K2) of the terminal 300 side. Each of the above enciphering system and deciphering system is a public-key enciphering system in which the ciphering key (K2) of the IC card 100 is used as a secret key and the deciphering key (K1) of the terminal 300 side is used as a public key.

Further, the XOR operation in the IC card 100 or terminal 300 indicates only one example of the process and another operation can be performed instead of the XOR operation.

Next, the authentication process for the terminal 300 by the IC card 100 is schematically explained.

In the authentication process for the terminal 300 by the IC card 100, it is determined whether or not the terminal 300 possesses an authentication key which the IC card 100 previously knows. The IC card 100 determines whether the terminal 300 possesses the authenticate key or not based on authentication data output from the terminal 300.

Figure 10:
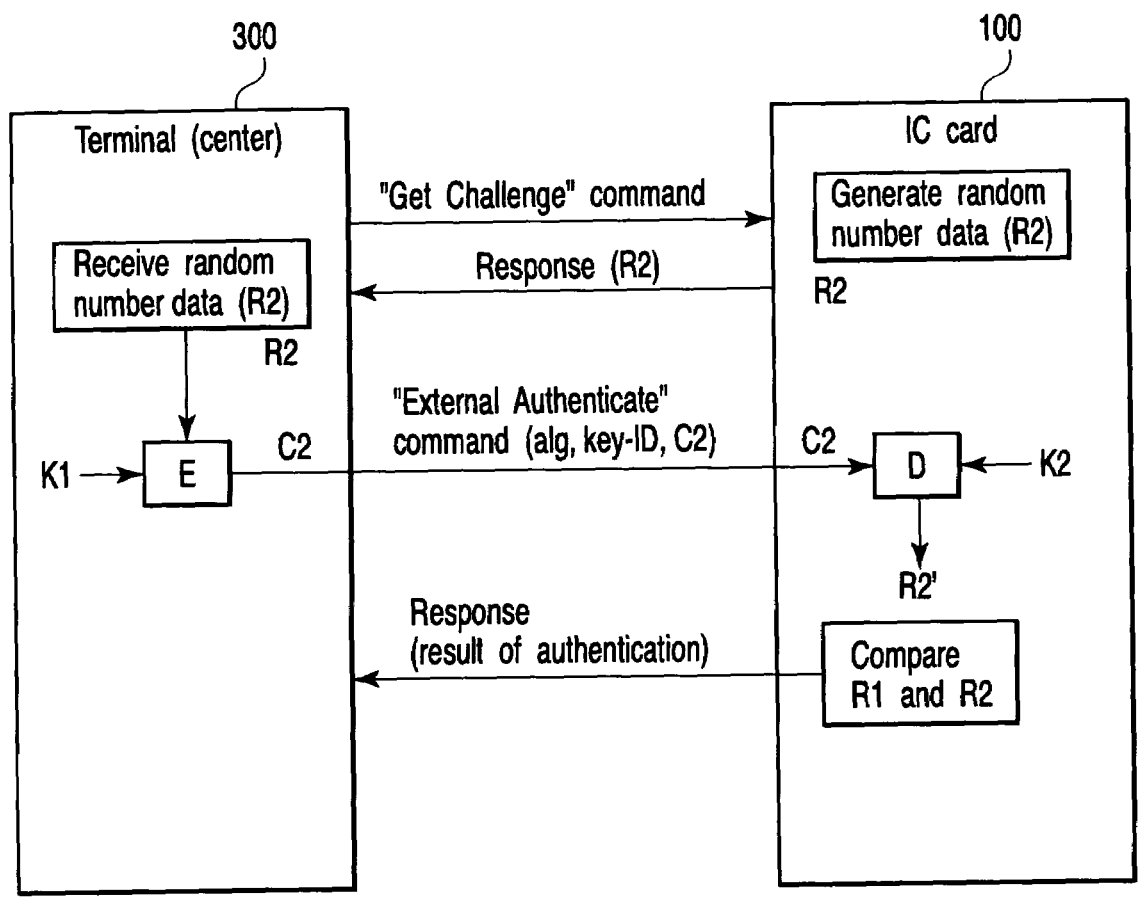
FIG. 10 is a diagram for illustrating for schematically illustrating an authentication process for the terminal by the IC card.

FIG. 10 is a diagram for schematically illustrating the authentication process for the terminal 300 by the IC card 100.

The authentication process for the terminal 300 by the IC card 100 shown in FIG. 10 is performed by the procedure of the steps S11 to S17 as will be explained below.

Step S11: The terminal 300 transmits the "Get Challenge" command to the IC card 100. Thus, the terminal 300 requests the IC card 100 to form random number (challenge) data.

Step S12: The IC card 100 receives the "Get Challenge" command from the terminal 300. The IC card 100 which has received the "Get Challenge" command forms random number data (R2). When forming the random number data (R2), the IC card 100 sends back the random number data (R2) as response data corresponding to the "Get Challenge" command to the terminal 300. The random number data (R2) is held in the working memory 106 of the IC card 100 for each logical channel as will be described later.

Step S13: The terminal 300 receives random number data (R2) as response data of the "Get Challenge" command from the IC card 100. When receiving the random number data (R2) as the response data, the terminal 300 determines key data (K1) and an algorithm (alg) necessary for authentication. In this case, the algorithm (alg) necessary for authentication is an enciphering algorithm used for enciphering and the key data is enciphering data necessary when the enciphering process is performed by use of the enciphering algorithm.

When the algorithm and key data used for the enciphering process are determined, the terminal 300 enciphers random number data (R2) received from the IC card 100 by use of the key data (K1) based on the thus determined algorithm. In this example, a value obtained by enciphering the random number data (R2) by use of the ciphering key (K1) is set as C2.

Step S14: After the random number data (R2) is enciphered by use of the key data (K1), the terminal 300 generates an "External Authenticate" command. The "External Authenticate" command is generated based on key data (key-ID), algorithm (alg) necessary for authentication, the result of the enciphering process (C2) and the like. In this case, the algorithm indicated by the "External Authenticate" command specifies an algorithm of the deciphering process to be performed in the IC card 100. Further, the key data (key-ID) indicated by the "External Authenticate" command specifies a deciphering key used for the deciphering process in the IC card 100.

That is, the key data (key-ID), algorithm necessary for authentication and the result of the deciphering process (C1) are used as parameters of the "External Authenticate" command. When the "External Authenticate" command is generated, the terminal 300 transmits the thus generated "External Authenticate" command to the IC card 100.

Step S15: The IC card 100 receives the "External Authenticate" command from the terminal 300. When the "External Authenticate" command is received, the IC card 100 determines the algorithm and deciphering key used for the deciphering process by use of the received "External Authenticate" command. The deciphering key is determined based on the key data (key-ID) included in the "External Authenticate" command. Further, the deciphering key is previously possessed by the IC card 100. For example, the deciphering key is stored in a nonvolatile memory such as the data memory 105.

If the algorithm and key data used for the deciphering process are determined, the IC card 100 deciphers a value (C2) received from the terminal 300 by use of the deciphering key (K2) based on the determined algorithm. In this case, a value obtained by deciphering the value (C2) by use of the deciphering key (K2) is set as R2'.

Step S16: When the value R2' is derived by deciphering the value (C2) by use of the deciphering key (K2), the IC card 100 compares the value R2' with the random number data (R2) generated in the step S12. When it is determined in the comparing process that the random number data (R2) coincides with R2', the IC card 100 authenticates the terminal 300 (the IC card 100 determines that the terminal 300 is a justified terminal). Further, if it is determined in the comparing process that the random number data (R2) does not coincide with R2', the IC card 100 does not authenticate the terminal 300 (the IC card 100 determines that the terminal 300 is not a justified terminal).

Step S17: The IC card 100 informs the terminal 300 of the comparison result of R2 and R2' (the result of authentication for the terminal 300 by the IC card 100) as a response. Further, the terminal 300 determines whether or not the terminal 300 itself is authenticated by the IC card 100 according to the response.

When Triple DES is used as an enciphering algorithm, the deciphering key (K2) of the IC card side is set equal to the enciphering key (K1) of the terminal side. Each of the above enciphering system and deciphering system is a secret key enciphering system in which both of the deciphering key (K2) of the IC card 100 and the ciphering key (K1) of the terminal 300 side are used as a secret key.

Further, when RSA is used as the enciphering algorithm, the deciphering key (K2) of the IC card 100 becomes different from the ciphering key (K1) of the terminal side. Each of the above enciphering system and deciphering system is a public-key enciphering system in which the ciphering key (K1) of the terminal 300 side is used as a secret key and the deciphering key (K2) of the IC card 100 is used as a public key.

Next, the "Get Challenge" command is explained in detail.

FIG. 11 is a diagram showing a format of the "GET Challenge" command.

As shown in FIG. 11, the "GET Challenge" command is configured by CLA data, INS data, P1 data, P2 data and Le data. The basic format of the command is configured by CLA data, INS data, P1 data, P2 data and Le data.

The CLA data has the configuration as shown in FIG. 7. In an example of the "Get Challenge" command shown in FIG. 11, b1, b2 in the CLA data are set to "01". That is, in the "Get Challenge" command shown in FIG. 11, the logical channel number "#1" is specified.

The INS data is information indicating the contents of the command. For example, in the example shown in FIG. 11, it is indicated that the INS data ("84") is the "Get Challenge" command (that is, the command which requests generation of a random number).

Further, the P1 data and P2 data indicate parameters of the command. In the "Get Challenge" command shown in FIG. 11, both of the P1 data and P2 data are set to "00". The Le data specifies the length of data. In the example of FIG. 11, the Le data ("08") requests generation of 8-byte random number data.

Therefore, in the "Get Challenge" command shown in FIG. 11, generation of 8-byte random number data is requested in the logical channel number "#1".

Next, an example in which random number data (random number data generated in correspondence to the "Get Challenge" command) is stored in the IC card is explained.

FIG. 12 is a diagram showing an example of the configuration of the random number data storage table 106b in the working memory 106.

When the "Get Challenge" command is received, the IC card 100 generates random number data with the length specified in the logical channel number specified by the "Get Challenge" command. In this case, random number data is held in the IC card 100 for each logical channel.

In the random number data storage table 106b shown in FIG. 12, a flag indicating that the "Get Challenge" command has been executed or not and random number data are stored for each logical channel (logical channel number). For example, when random number data is generated in the logical channel number "#1", a flag indicating that the "Get Challenge" command has been executed in the logical channel number "#1" is set as shown in FIG. 12 and random number data thus generated is stored as random number data of the logical channel number "#1" in the storage table 106b.

By use of the storage table 106b, random number data can be held for each logical channel.

Next, a response with respect to the command is explained.

FIG. 13 is a diagram showing an example of the configuration of a response with respect to the command.

The IC card 100 which has received the command from the terminal 300 performs the process corresponding to the command and transmits the response indicating the result of the process and the like to the terminal 300. As shown in FIG. 13, the format of the response is configured by response data and status word.

The response data is data obtained by the process corresponding to the command. For example, random number data generated from the IC card 100 is stored in the response data for the "Get Challenge" command.

The status word indicates the result of the process corresponding to the command. For example, when the process corresponding to the command is correctly performed, a status indicating that the process corresponding to the command has been correctly performed is stored in the status word. If the process corresponding to the command is erroneously performed, a status indicating that the process corresponding to the command has been erroneously performed is stored in the status word.

Next, an example of the operation of the IC card 100 performed when the "Get Challenge" command is received is explained.

FIG. 14 is a flowchart for illustrating the operation of the IC card 100 when the "Get Challenge" command is received.

First, it is assumed that the communicating section 102 of the IC card 100 receives a command from the terminal 300 (step S31). Then, the control element 104 of the IC card 100 determines the contents of the command according to the INS data of the received command (step S32). If it is determined that the command received by the communicating section 102 is a command other than the "Get Challenge" command ("NO" in the step S32), the control element 104 of the IC card 100 performs the process corresponding to the received command (step S33).

If it is determined that the command received by the communicating section 102 is the "Get Challenge" command ("YES" in the step S32), the control element 104 of the IC card 100 determines the length of random number data generated based on Le data of the "Get Challenge" command. When the length of the random number data generated is determined, the control element 104 of the IC card 100 generates random number data with the specified length (step S34).

When the random number data is thus generated, the control element 104 of the IC card 100 stores the generated random number data into the storage table 106b of the working memory 106 in correspondence to the logical channel number specified by the CLA data of the "Get Challenge" command. Further, the control element 104 of the IC card 100 sets a flag indicating that the "Get Challenge" command (generation of the random number data) has been executed in the logical channel number (step S36).

Thus, random number data and a flag indicating that the "Get Challenge" command (generation of the random number data) has been executed are stored in the storage table 106b of the working memory 106 for each logical channel number specified by the "Get Challenge" command.

Further, when random number data generated in correspondence to the "Get Challenge" command is stored in the storage table 106b, the control element 104 of the IC card 100 transmits the generated random number data as response data to the terminal 300 which is a transmission source of the "Get Challenge" command (step S37).

By the above operation, random number data generated in correspondence to the "Get Challenge" command is stored in the storage table 106b of the working memory 106 for each logical channel number and transmitted to the transmission source of the "Get Challenge" command as response data.

Next, the authentication process (external authentication process) for the terminal 300 by the IC card 100 is explained in detail.

The external authentication process is performed when the IC card 100 receives an "External Authenticate" command from the terminal 300. That is, the terminal 300 used as an external device requests the IC card 100 to authenticate the terminal based on the "External Authenticate" command. The IC card 100 authenticates the terminal 300 used as the external device according to the request based on the "External Authenticate" command.

First, the "External Authenticate" command is explained in detail.

FIG. 15 is a diagram showing the format of the "External Authenticate" command.

As shown in FIG. 15, the "External Authenticate" command includes CIA data, INS data, P1 data, P2 data, Le data and data portion.

The CLA data has the configuration as shown in FIG. 7. In an example of the "External Authenticate" command shown in FIG. 15, b1, b2 of the CIA data are set to "01". That is, in the "External Authenticate" command shown in FIG. 15, the logical channel number "#1" is specified. Further, in the example shown in FIG. 15, it is indicated that the INS data ("82") is the "External Authenticate" command (that is, a command which requests external authentication). In the data portion, data supplied from the terminal 300 to the IC card 100 is stored. For example, in the example shown in FIG. 10, data C2 is stored in the data portion.

Further, as shown in FIG. 15, the P1 data and P2 data are set parameters of the "External Authenticate" command. For example, FIG. 16 shows an example of the P1 data of the "External Authenticate" command. As shown in FIG. 16, in the "External Authenticate" command, the P1 data indicates an authentication algorithm used in the authentication process. In the example of FIG. 16, as the algorithm used in the authentication process, single DES is indicated when the P1 data is "01" and triple DES is indicated when the P1 data is "02".

Further, FIG. 17 shows an example of the P2 data of the "External Authenticate" command. As shown in FIG. 17, in the "External Authenticate" command, the P2 data indicates key data (Key-ID) used in the authentication process. In the example of FIG. 17, key data used in the authentication process in the P2 data is indicated by "01" to "1F". FIG. 18 shows a concrete example of key data in the P2 data. In the example of FIG. 18, 31 types of key data items can be specified by use of "0x01" to "0x1F" in the P2 data.

Therefore, in the "External Authenticate" command shown in FIG. 15, a request is made to perform the external authentication process by use of the algorithm indicated by the P1 data and key data indicated by the P2 data in the logical channel number "#1".

Next, the operation example of the IC card 100 performed when the "External Authenticate" command is received is explained.

Figure 19:
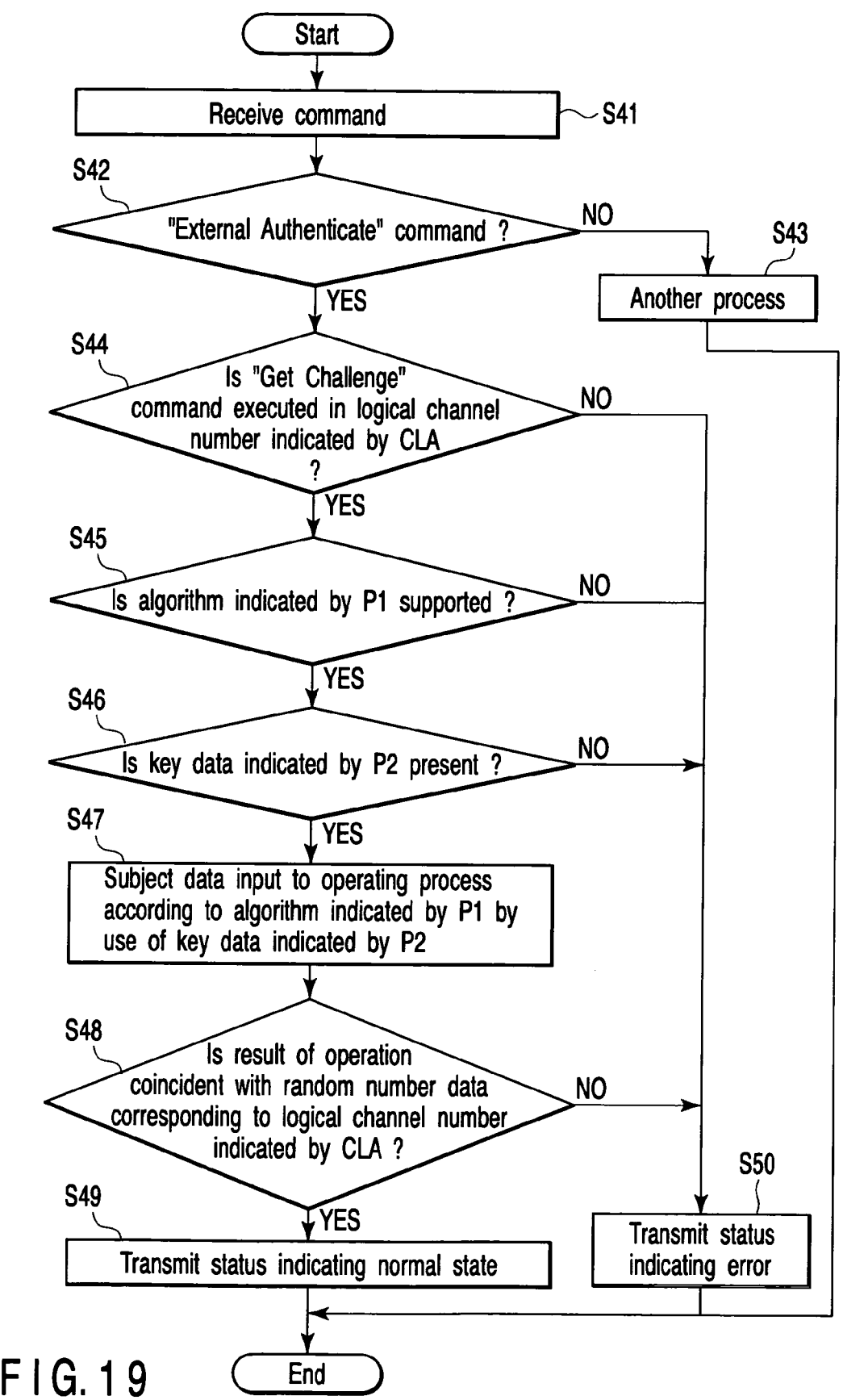
FIG. 19 is a flowchart for illustrating the operation of an IC card when the "External Authenticate" command is received.

FIG. 19 is a flowchart for illustrating the operation of the IC card when the "External Authenticate" command is received.

First, assume that the communicating section 102 of the IC card 100 receives a command from the terminal 300 (step S41). Then, the control element 104 of the IC card 100 determines the contents of the command according to INS data of the received command (step S42). If it is determined that the command received by the communicating section 102 is a command other than the "External Authenticate" command ("NO" in the step S42), the control element 104 of the IC card 100 performs a process corresponding to the received command (step S43).

If it is determined that the command received by the communicating section 102 is the "External Authenticate" command ("YES" in the step S42), the control element 104 of the IC card 100 determines whether or not the "Get Challenge" command has been executed in the logical channel number specified by CLA data of the "External Authenticate" command (step S44).

That is, in the step S44, it is determined whether or not a flag (which is a flag indicating that the "Get Challenge" command has been executed or not) corresponding to the logical channel number specified by CLA data of the "External Authenticate" command is set in the storage table 106b of the working memory 106. In other words, in the step S44, the control element 104 determines whether or not random number data corresponding to the logical channel number specified by the "External Authenticate" command is stored in the storage table 106b.

If it is determined in the above determination process that the "Get Challenge" command is not executed in the logical channel number specified by the "External Authenticate" command ("NO" in the step S44), the control element 104 of the IC card 100 transmits a response in which a status word indicating an error is set to the terminal 300 (step S50). In this case, in the status word, for example, a status indicating that the "Get Challenge" command is not executed in the logical channel number is stored.

Further, if it is determined in the above determination process that the "Get Challenge" command has been executed in the logical channel number specified by the "External Authenticate" command ("YES" in the step S44), the control element 104 of the IC card 100 determines whether or not the algorithm specified by the P1 data of the "External Authenticate" command is supported by the IC card 100 (step S45).

That is, in the step S45, the control element 104 determines whether or not the algorithm specified by the "External Authenticate" command can be executed.

If it is determined in the above determination process that the algorithm specified by the "External Authenticate" command is not supported by the IC card 100 ("NO" in the step S45), the control element 104 of the IC card 100 transmits a response in which a status word indicating an error is set to the terminal 300 (step S50). In this case, in the status word, for example, a status indicating that the IC card does not correspond to the algorithm specified by the "External Authenticate" command is stored.

Further, if it is determined in the above determination process that the algorithm specified by the "External Authenticate" command is supported by the IC card 100 ("YES" in the step S45), the control element 104 of the IC card 100 determines whether or not key data specified by the P2 data of the "External Authenticate" command is held in the IC card 100 (step S46).

That is, the control element 104 determines in the step S46 whether or not the IC card holds key data specified by the "External Authenticate" command.

If it is determined in the above determination process that the IC card 100 does not possesses key data specified by the "External Authenticate" command ("NO" in the step S46), the control element 104 of the IC card 100 transmits a response in which a status word indicating an error is set to the terminal 300 (step S50). In this case, in the status word, for example, a status indicating that the IC card does not hold key data specified by the "External Authenticate" command is stored.

If it is determined in the above determination process that the IC card 100 holds key data specified by the "External Authenticate" command ("YES" in the step S46), the control element 104 of the IC card 100 processes data stored in the data portion of the "External Authenticate" command by use of the algorithm specified by P1 data of the "External Authenticate" command and key data specified by P2 data (step S47).

When the result of the process in the step S47 is obtained, the control element 104 of the IC card 100 determines whether or not the result of the process coincides with random number data corresponding to the logical channel number specified by the "External Authenticate" command (step S48).

If it is determined in the above determining process that the result of the process coincides with random number data corresponding to the logical channel number ("YES" in the step S48), the control element 104 of the IC card 100 transmits a response in which a status word indicating a normal state (that is, a status word indicating that the IC card 100 has authenticated the terminal 300 as the external device) is set to the terminal 300 (step S49).

Further, if it is determined in the above determining process that the result of the process in the step S47 does not coincide with random number data corresponding to the logical channel number ("NO" in the step S48), the control element 104 of the IC card 100 transmits a response in which a status word indicating an error is set to the terminal 300 (step S50). In this case, in the status word, for example, a status word indicating that the IC card could not authenticate the terminal 300 as the external device is stored.

By comparing the operation example shown in FIG. 19 with the example shown in FIG. 10, it is understood that data stored in the data portion of the "External Authenticate" command is C2 shown in FIG. 10, the algorithm indicated by the P1 data of the "External Authenticate" command is (alg) shown in FIG. 10, and key data indicated by the P2 data of the "External Authenticate" command is (Key-ID) shown in FIG. 10.

Further, the operating process in the step S47 is a decoding process D for data C2 using the algorithm indicated by the P1 data of the "External Authenticate" command and a decoding key (K2) indicated by the P2 data of the "External Authenticate" command.

According to the above external authentication process, random number data can be held for each logical channel number and the external authentication process utilizing random number data for each logical channel can be realized.

Next, the authentication process (internal authentication process) of the IC card 100 carried out by the terminal 300 is explained in detail. The internal authentication process is performed by causing the terminal 300 to supply the "Internal Authenticate" command to the IC card 100. That is, the terminal 300 as the external device performs the authentication process of the IC card 100 based on response data output from the IC card 100 in response to the "Internal Authenticate" command.

First, the "Internal Authenticate" command is explained in detail.

Figures 20, 21:
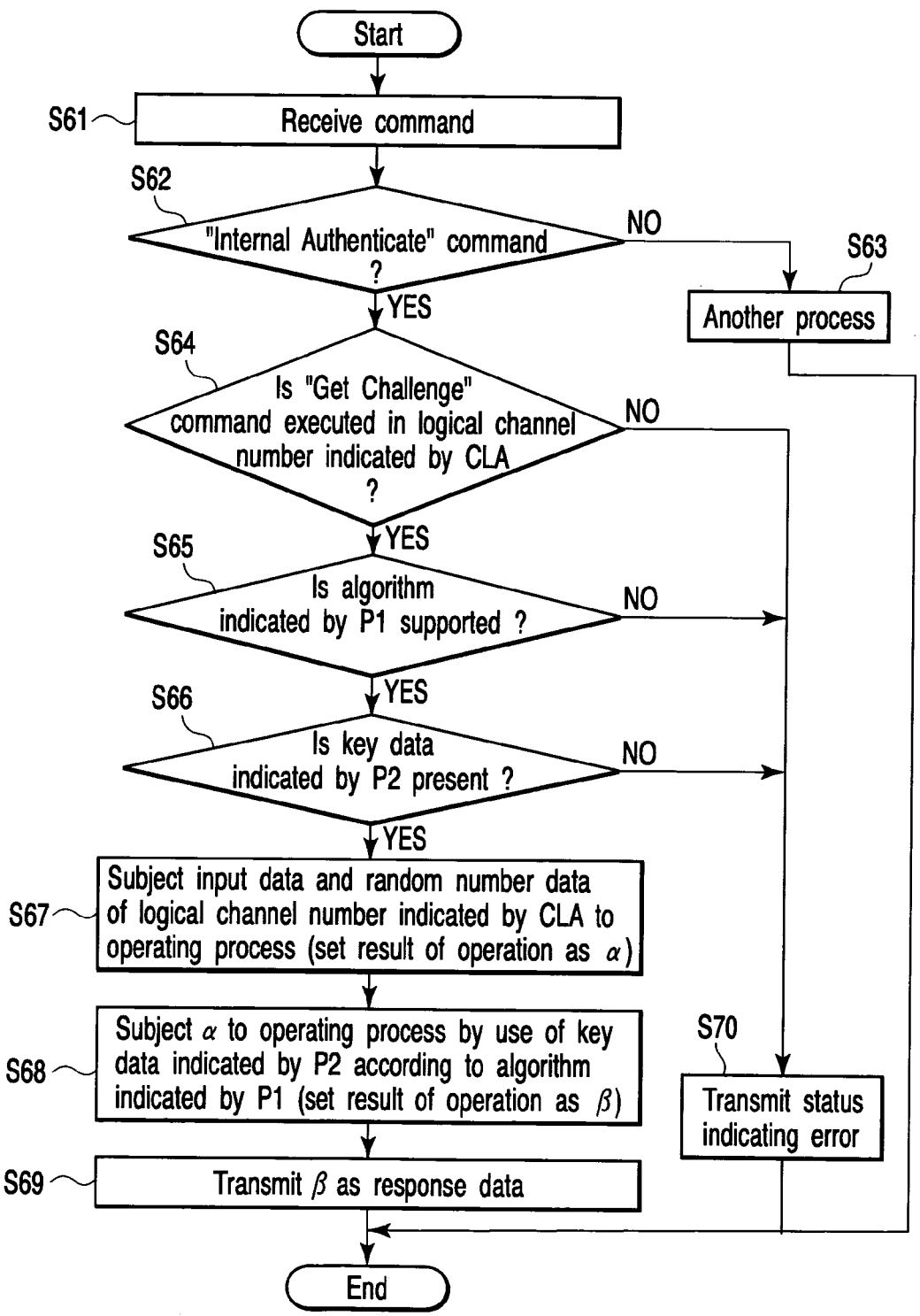
FIG. 20 is a diagram showing a format of an "Internal Authenticate" command.
FIG. 21 is a flowchart for illustrating the operation of an IC card when the "Internal Authenticate" command is received.

FIG. 20 is a diagram showing the format of the "Internal Authenticate" command.

As shown in FIG. 20, the "Internal Authenticate" command is configured by CLA data, INS data, P1 data, P2 data, Le data and data portion.

The CLA data has the configuration as shown in FIG. 7. In an example of the "Internal Authenticate" command shown in FIG. 20, b1, b2 of the CLA data are set to "01". That is, in the "Internal Authenticate" command shown in FIG. 20, a logical channel number "#1" is specified. In the example shown in FIG. 20, a case where the INS data ("88") is the "Internal Authenticate" command (that is, a command which requests the internal authentication process) is shown. Further, in the data portion, data supplied from the terminal 300 to the IC card 100 is stored. For example, in the example shown in FIG. 9, random number data R1 is stored in the data portion.

As shown in FIG. 20, the P1 data and P2 data are set as parameters of the "Internal Authenticate" command. As shown in FIG. 16, for example, like the P1 data of the "External Authenticate" command, the P1 data of the "Internal Authenticate" command indicates an authentication algorithm used in the authentication process.

Further, as shown in FIGS. 17 and 18, for example, like the P2 data of the "External Authenticate" command, the P2 data of the "Internal Authenticate" command indicates key data (Key-ID) used in the authentication process.

Therefore, in the "Internal Authenticate" command shown in FIG. 20, it is requested to perform the data processing operation (enciphering process) in the data portion by using the algorithm indicated by the P1 data and key data indicated by the P2 data in the logical channel number "#1".

Next, the operation example of the IC card 100 at the time of reception of the "Internal Authenticate" command is explained.

FIG. 21 is a flowchart for illustrating the operation of the IC card 100 when the "Internal Authenticate" command is received.

First, assume that the communicating section 102 of the IC card 100 receives a command from the terminal 300 (step S61). Then, the control element 104 of the IC card 100 determines the contents of the command based on INS data of the received command (step S62). If it is determined that the command received by the communicating section 102 is a command other than the "Internal Authenticate" command ("NO" in the step S62), the control element 104 of the IC card 100 performs a process corresponding to the received command (step S63).

If it is determined that the command received by the communicating section 102 is the "Internal Authenticate" command ("YES" in the step S62), the control element 104 of the IC card 100 determines whether or not the "Get Challenge" command has been executed in the logical channel number specified by CLA data of the "Internal Authenticate" command (step S64).

That is, in the step S64, it is determined whether or not a flag (which is a flag indicating that the "Get Challenge" command has been executed or not) corresponding to the logical channel number specified by the CLA data of the "Internal Authenticate" command is set in the storage table 106b of the working memory 106.

In other words, in the step S64, the control element 104 determines whether or not random number data corresponding to the logical channel number specified by the "Internal Authenticate" command is stored in the storage table 106b.

If it is determined in the above determining process that the "Get Challenge" command is not executed in the logical channel number specified by the "Internal Authenticate" command ("NO" in the step S64), the control element 104 of the IC card 100 transmits a response in which a status word indicating an error is set to the terminal 300 (step S70). In this case, in the status word, for example, a status indicating that the "Get Challenge" command is not executed in the logical channel number is stored.

Further, if it is determined in the above determination process that the "Get Challenge" command has been executed in the logical channel number specified by the "Internal Authenticate" command ("YES" in the step S64), the control element 104 of the IC card 100 determines whether or not the algorithm specified by the P1 data of the "Internal Authenticate" command is supported by the IC card 100 (step S65). That is, in the step S65, the control element 104 determines whether or not the algorithm specified by the "Internal Authenticate" command can be executed.

If it is determined in the above determination process that the algorithm specified by the "Internal Authenticate" command is not supported by the IC card 100 ("NO" in the step S65), the control element 104 of the IC card 100 transmits a response in which a status word indicating an error is set to the terminal 300 (step S70). In this case, in the status word, for example, a status indicating that the IC card does not correspond to the algorithm specified by the "Internal Authenticate" command is stored.

Further, if it is determined in the above determination process that the algorithm specified by the "Internal Authenticate" command is supported by the IC card 100 ("YES" in the step S65), the control element 104 of the IC card 100 determines whether or not key data specified by the P2 data of the "Internal Authenticate" command is held in the IC card 100 (step S66). That is, the control element 104 determines in the step S66 whether or not the IC card holds key data specified by the "Internal Authenticate" command.

If it is determined in the above determination process that the IC card 100 does not possess key data specified by the "Internal Authenticate" command ("NO" in the step S66), the control element 104 of the IC card 100 transmits a response in which a status word indicating an error is set to the terminal 300 (step S70). In this case, in the status word, for example, a status indicating that the IC card does not hold key data specified by the "Internal Authenticate" command is stored.

If it is determined in the above determination process that the IC card 100 holds key data specified by the "Internal Authenticate" command ("YES" in the step S66), the control element 104 of the IC card 100 performs the operating process (for example, an XOR operating process in the example of FIG. 9) for random number data of the logical channel number specified by the "Internal Authenticate" command and data stored in the data portion of the "Internal Authenticate" command (step S67).

When the result of the operating process in the step S67 (the result of the operating process in the step S67 is set to α) is obtained, the control element 104 of the IC card 100 subjects the result α of the process to an operating process (for example, an enciphering process) by use of the algorithm specified by the P1 data of the "Internal Authenticate" command and key data specified by the P2 data (step S68).

When the result of the operating process in the step S68 (the result of the process in the step S68 is set to β) is obtained, the control element 104 of the IC card 100 transmits a response containing the result β of the process as response data to the terminal 300 (step S69).

By comparing the operation example shown in FIG. 20 with the example shown in FIG. 9, it is understood that data stored in the data portion of the "Internal Authenticate" command is R1 shown in FIG. 9, the algorithm indicated by the P1 data of the "Internal Authenticate" command is (alg) shown in FIG. 9, and key data indicated by the P2 data of the "Internal Authenticate" command is (Key-ID) shown in FIG. 9.

Further, the operating process in the step S67 is an XOR operating process for R1 and R2 and the operating process in the step S68 is an enciphering process E for data D2 using the algorithm indicated by the P1 data of the "Internal Authenticate" command and a ciphering key (K2) indicated by the P2 data of the "Internal Authenticate" command.

According to the above internal authentication process, the IC card can hold random number data for each logical channel number and the internal authentication process utilizing random number data for each logical channel can be realized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A portable electronic device comprising:
    a first memory which stores data,
    a second memory which stores management information for data stored in the first memory for each logical channel,
    a control section which controls access to data stored in the first memory based on management information stored for each logical channel in the second memory; and
    wherein pointer information indicating a position of access with respect to data stored in the first memory is stored in the second memory as management information for each logical channel.

2. The portable electronic device according to claim 1, wherein information items each indicating a logical channel corresponding to data stored in the first memory are stored in the second memory as management information.

3. The portable electronic device according to claim 1, further comprising a communicating section which transmits/receives data with respect to an exterior,
    wherein the control section controls access to the first memory based on a logical channel indicated by a command received by the communicating section and management information corresponding to a logical channel specified by the command stored in the second memory.

4. A portable electronic device comprising:
    a first memory which stores files divided into a plurality of record data areas,
    a second memory which stores pointer information for the record data area in the file stored in the first memory for each logical channel, and
    a control section which controls access to data in the file stored in the first memory based on pointer information for each logical channel stored in the second memory.

5. The portable electronic device according to claim 4, wherein position information indicating a position of a record data area of the file stored in the first memory is stored in the second memory as pointer information.

6. The portable electronic device according to claim 4, wherein the files are stored in record data areas which are divided for respective record numbers in the first memory, and information indicating a record number used to identify the record data area in the file is stored in the second memory as pointer information.

7. The portable electronic device according to claim 4, wherein a plurality of files are stored in the first memory and the control section initializes pointer information for each logical channel stored in the second memory when a file to be accessed is changed.

8. The portable electronic device according to claim 4, comprising a communicating section which transmits/receives data with respect to an exterior, wherein a plurality of files are stored in the first memory and the control section selects one of the plurality of files stored in the first memory based on a file selection command containing information indicating a logical channel and initializes pointer information stored in the second memory when the file selection command is received from the exterior via the communicating section.

9. A portable electronic device comprising:

a communicating section which performs data transmission/reception with respect to an exterior, a control section which forms data according to a received command which requests formation of data containing information indicating a logical channel when the communicating section receives the command from the exterior, and a memory which stores data formed by the control section as data corresponding to a logical channel specified by the command.

10. The portable electronic device according to claim 9, wherein the control section performs a process requested by a command which contains information indicating a logical channel and requests the control section to perform the process as a process for each logical channel by use of data corresponding to the logical channel specified by the received command and contained in data items stored in the memory when the command is received from the exterior by the communicating section.

11. The portable electronic device according to claim 9, wherein the control section forms data used in an authentication process according to a command which requests formation of data used in an authentication process and containing information which specifies a logical channel when the command is received by the communicating section and the memory stores data formed by the control section as data used in the authentication process according to a logical channel specified by the command.

12. The portable electronic device according to claim 9, wherein the control section forms random number data according to a received command which requests formation of random number data containing information indicating a logical channel when the command is received by the communicating section and the memory stores random number data formed by the control section as random number data corresponding to the logical channel specified by the command.

* * * * *